April 26, 1966     SHIGEJI SAWADA     3,248,272

METHOD OF MAKING EXTENSIBLE FLEXIBLE HOSE

Filed June 18, 1963

INVENTOR
SHIGEJI SAWADA

ATTORNEY 3,248,272
METHOD OF MAKING EXTENSIBLE
FLEXIBLE HOSE
Shigeji Sawada, 243 Sanjocho, Ashiya-shi, Japan
Filed June 18, 1963, Ser. No. 288,805
Claims priority, application Japan, Aug. 17, 1960,
35/41,843
5 Claims. (Cl. 156—143)

This application is a continuation-in-part of copending application Serial No. 131,608, filed August 15, 1961, now abandoned.

This invention relates to a flexible hose and, more particularly, to an extensible flexible hose including a thin-walled thermoplastic tubing with a helical reinforcement for imparting thereto an axial extensibility, in the nature of that possessed by a bellows, and a self-supporting strength sufficient to withstand an internal vacuum. The invention also relates to the method employed in making the hose.

The heretofore known extensible flexible hose of the general character described above is advantageous not only in that it has a satisfactory axial resiliency and a substantial flexibility but it is also light in weight and inexpensive. It has, however, been found that such flexible hose has a deficiency in that the thermoplastic tubing is so limited in wall thickness that any minute flaws, which may possibly be formed therein by contact of some external object therewith, may readily develop into substantial cracks. Such deficiency is particularly conspicuous when the thermoplastic tubing has become rigid by exposure to low temperatures or when it has materially deteriorated in strength by fatigue or aging.

The present invention provides a flexible hose of the kind described which is free from cracks, as frequently occurred in previous hoses, and has a greatly improved durability. The invention also provides such flexible hose having a strength which is readily predetermined.

In making the hose of the present invention, a novel method is employed in which a liquid thermoplastic material or rubber is applied to a seamless tube of knitted fabric, after which a reinforcing member, such as a wire or a wire encased in a synthetic resin or rubber is helically wound around the periphery of the knitted fabric; the thermoplastic material is then solidified. Exemplary thermoplastic materials which may be liquid and elastic are polyvinyl resins, such as polyvinyl chloride and polyvinyl acetate, and acrylate resins such as polymethylmethacrylate. These resins may contain suitable plasticizers, if desired.

Figure 1:
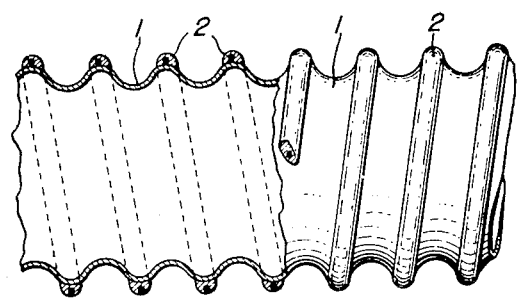
Figure 2:
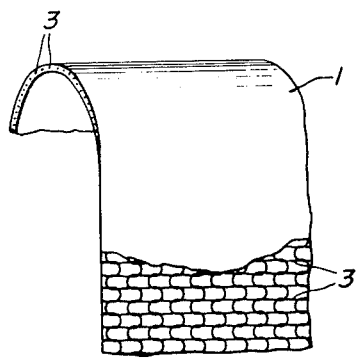
Figure 3:
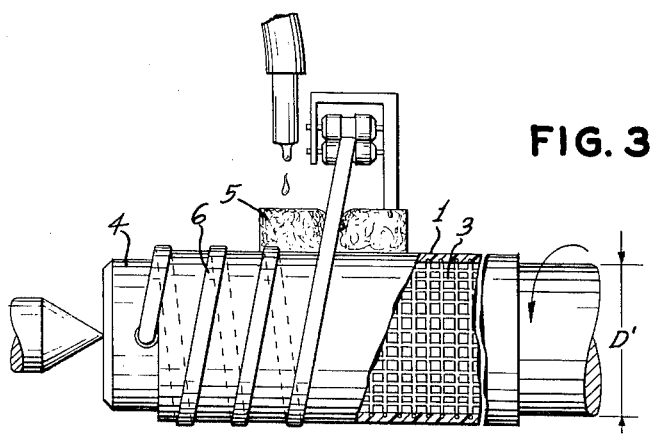

The foregoing and other objects, features and advantages of the present invention will be apparent from the following description when taken with reference to the accompanying drawing, in which:

FIGURE 1 is a fragmentary view in elevation, partly in section, of a flexible hose made in accordance with the present invention, FIGURE 2 is a fragmentary perspective view of a thin-walled tubing of thermoplastic resin material or rubber with a tube of nylon netting embedded therein, and FIGURE 3 is a fragmentary view in elevation, partly in section, of the winding step of the method of making the hose of the present invention.

Referring to the drawing and particularly to FIGURE 1, there is shown a flexible hose made according to the invention which comprises a thin-walled flexible tubing 1 made of thermoplastic material, such as a synthetic resin, or rubber and having itself no substantial self-supporting strength sufficient to withstand internal vacuum. Numeral 2 designates a reinforcing member in the form of a strip joined to the tubing 1 and helically extending around the periphery thereof to impart to the hose a substantial axial resilience and a substantial self-supporting strength sufficient to withstand any internal vacuum as applied thereto in use. The strip 2 may be formed of any highly resilient material which is readily joinable with the flexible tubing 1, such as a strip of highly resilient synthetic resin or rubber or a metal wire encased in a synthetic resin or rubber.

According to the present invention, the flexible tubing 1 has a seamless reinforcing tube 3 of knitted fabric embedded therein. The fabric tube is preferably knitted from relatively tough and fine threads of cotton, silk, or synthetic fiber such as nylon. The flexible tubing 1, with the tube 3 of knitted fabric embedded therein, may be produced in various ways. In a preferred method, a seamless tube of knitted fabric, such as nylon netting, is fitted over a mandrel and a thermoplastic resin paste is coated over the fabric tube to fill the interstices of the netting. The coating is heat-dried at 200° C. to 230° C. Another coating of the resin paste is formed on the surface of the coated fabric tube to impart a substantial self-supporting strength thereto and heat-dried at the same temperature of 200° C. to 230° C. to set or vulcanize the resin or rubber. By this means, a flexible tubing is obtained which includes a nylon netting having its interstices completely filled with a resin or rubber and a thin resin or rubber layer covering the nylon netting. In another example, a fabric tube is immersed in a liquid thermoplastic resin material, and the resin material adhering to the fabric tube is solidified after the latter is drawn out of the liquid bath. Also, the flexible tubing 1 may be a double-walled tubing comprising an inner and an outer tube wall with a tubular knitted fabric interposed between, and bonded to, the two tube walls. Alternatively, the flexible tubing 1 may be formed on an extruding machine while simultaneously feeding a tubular knitted fabric therethrough. Other procedures may also be employed as will be apparent to those skilled in the art.

In the winding stage of the method, the thermoplastic or rubber tubing 1 having the seamless tube 3, for example, of nylon netting, embedded therein is first fitted over a mandrel 4 having an external diameter D'. The diameter D' is about 20 to 25 percent larger than the diameter of the mandrel on which the tube was formed. In fitting the thermoplastic tubing 1 over the mandrel 4, air under pressure is introduced into the tubing to expand it thereby to facilitate the fitting operation. The mandrel, with the tubing fitted thereon is mounted on a suitable lathe and a separate strip, such as a strip of highly resilient synthetic resin or a hard steel wire encased in synthetic resin strip is secured at one end to the mandrel 4. The vinyl chloride strip 6 is helically wound around the periphery of the thermoplastic tubing 1 by turning the lathe at a speed of approximately 800 r.p.m. During the winding operation, the wire is maintained under a tension of from 5 to 7 kg./cm.$^2$ and is adhesively bonded securely to the periphery of the tubing while being wound around it. To this end, a fabric piece 5, e.g., of flannel, is wetted, for example, with an adhesive agent or solvent for vinyl chloride, such as tetrahydrofuran, by an arrangement such that the adhesive agent continuously drips onto the piece of flannel 5. The piece of flannel 5 is held in sliding engagement with the surface of the tubing 1 and the bottom surface of the strip 6 being wound thereon so that the adhesive is applied to both surfaces before they are brought into engagement with each other. In one example, about two hundred turns of the reinforcing strip were formed on a length of tubing in about 20 seconds.

The thermoplastic or rubber tubing 1, now having the reinforcing member 3 wound thereon, is dried for 10 minutes while on the mandrel, at a temperature of 50° C.

to 60° C., in a suitable drier to vaporize the excess of adhesive agent or solvent. The tubing is then removed from the mandrel as a finished product.

The hose body or tubing 1 when on the mandrel of diameter D' is maintained stretched about 20 percent to 25 percent. Upon removal from the mandrel, the exposed helical areas of the tubing which extend between adjacent turns of the reinforcing member or strip are allowed to contract radially inwardly to form corrugations imparting a satisfactory extensibility to the finished product.

As is apparent from the foregoing, the method of the present invention is simplified by the elimination of any separate corrugating step, the forming and corrugating of the hose being effected automatically during the winding operation.

The body or tubing 1 of the hose made according to the invention is comprised of a tubular knitted fabric, the resin or rubber layer in the body 1 serving only to fill the interstices of the knitted fabric and to provide a base to which the reinforcing strip is bonded. The strength of the hose thus depends primarily upon the strength of the knitted fabric and thus is readily predetermined by selecting proper knitted fabrics. In contrast, conventional flexible hoses of the kind described have been designed relying primarily upon the flexibility of a tube of vinyl chloride or other elastic material.

As is known, threads in a knitted fabric intertwine with each other curving in varying directions. Thus, with the hose of the present invention, any formation of cracks in the wall of the tubular body is effectively prevented by the knitted fabric embedded therein. The use of the knitted fabric, which is highly flexible, never impairs the flexibility of the tubing 1 and the knitted fabric, being free to expand and contract in both axial and radial directions, allows the flexible tubing 1 to be freely corrugated under tension.

The present invention thus provides a flexible hose having an enhanced utility overcoming the deficiencies encountered with previous forms of flexible hose, particularly by the use of a hose construction including a tubular knitted fabric embedded in a flexible thermoplastic or rubber tubing 1. Where a seamless tube of nylon netting is used, it has been found that the durability of the hose can be increased about eight to ten times that of previous hoses.

Further, it is noted that an extraordinarily attractive appearance may be obtained with the hose fabricated according to the present invention where the thin-walled tubing 1 is made of a transparent material and the tubular knitted fabric is suitably colored.

It will be obvious to those skilled in the art that many modifications may be made within the scope of the present invention without departing from the spirit thereof, and the invention includes all such modifications.

What is claimed is:

1. A method of making an extensible flexible hose which comprises applying a liquid elastic material to a seamless tube of knitted fabric to form a thin-walled tubing having the knitted fabric embedded therein, expanding the tubing with air under pressure and mounting said tubing on a mandrel, helically winding a strip of resilient material around the periphery of the tubing on the mandrel while applying an adhesive agent between the strip and the tubing, and removing the tubular assembly from the mandrel after the adhesive agent has solidified.

2. A method according to claim 1 in which the knitted fabric is a nylon netting.

3. A method according to claim 1 in which the strip is wire encased in a resilient synthetic resin.

4. A method according to claim 1 in which the elastic material is an elastic thermoplastic resin.

5. A method according to claim 1 in which the elastic material is rubber.

References Cited by the Examiner

UNITED STATES PATENTS

| | | | |
|---|---|---|---|
| 982,248 | 1/1911 | Chernack | 138—132 |
| 1,849,717 | 3/1932 | Kennedy | 138—125 |
| 2,570,259 | 10/1951 | McKinley | 156—143 |
| 2,749,943 | 6/1956 | Nemeth | 138—125 |
| 2,961,007 | 11/1960 | Martin | 138—122 |
| 3,018,800 | 1/1962 | Hanssens | 156—294 XR |

FOREIGN PATENTS 552,032   3/1943   Great Britain.

EARL M. BERGERT, *Primary Examiner.*